United States Patent
Richter

[11] 3,810,635
[45] May 14, 1974

[54] MECHANICAL SEAL
[75] Inventor: Harvey E. Richter, Farmington, Conn.
[73] Assignee: The Tec Group, Inc., Bloomfield, Conn.
[22] Filed: Mar. 20, 1972
[21] Appl. No.: 236,433

[52] U.S. Cl. .................................. 277/34, 277/62
[51] Int. Cl. ............................................. F16j 15/46
[58] Field of Search ............ 277/34, 34.3, 63, 62, 61

[56] References Cited
UNITED STATES PATENTS

| | | | |
|---|---|---|---|
| 2,215,034 | 9/1940 | Gorman | 277/62 |
| 2,719,737 | 10/1955 | Fletcher | 277/34.3 |
| 2,906,565 | 9/1959 | Scherba | 277/34 X |
| 2,989,966 | 6/1961 | Marshall | 277/34 X |
| 3,218,086 | 11/1965 | Donley | 277/62 X |
| 3,276,382 | 10/1966 | Richter | 417/247 |
| 3,704,020 | 11/1972 | Huhn | 277/62 |

*Primary Examiner*—Samuel B. Rothberg
*Attorney, Agent, or Firm*—Prutzman, Hayes, Kalb & Chilton

[57] ABSTRACT

A mechanical rotary seal for sealing fluid flow between a generally cylindrical rotor and a generally cylindrical stator, the seal including seal ring means concentrically mounted for limited axial movement on the stator and seal mating ring means fixed on the rotor and jointly defining with the seal ring means an enclosed annular compartment located radially inwardly of the seal interfaces between the seal ring means and the seal mating ring means, and a fluid energized sealing member fixed to the stator and serving to bias the seal ring means into engagement with the seal mating ring means.

10 Claims, 4 Drawing Figures

PATENTED MAY 14 1974

MECHANICAL SEAL

This invention generally relates to sealing devices and particularly concerns a mechanical seal for rotary units capable of operating under relatively high peripheral speed conditions.

A primary object of this invention is to provide a new and improved positive acting mechanical seal particularly suited for effective operation under high peripheral speed conditions and which may be quickly and easily adjusted for changing the sealing pressures to correspond to the operating conditions.

Another object of this invention is to provide a new and improved mechanical rotary seal which utilizes centrifugal force caused by rotation of a rotor to move any contaminants away from the sealing interfaces of the seal.

A further object of this invention is to provide a seal of the above described type which is particularly suited to compensate for seal interface wear.

Still another object of this invention is to provide a new and improved mechanical rotary seal for sealing off fluid flow between relatively rotating cylindrical surfaces of large diameter.

Other objects will be in part obvious and in part pointed out in more detail hereinafter.

A better understanding of the objects, advantages, features, properties and relationships of the invention will be obtained from the following detailed description and accompanying drawings which set forth an illustrative embodiment and is indicative of the way in which the principle of the invention is employed.

Figure 1:
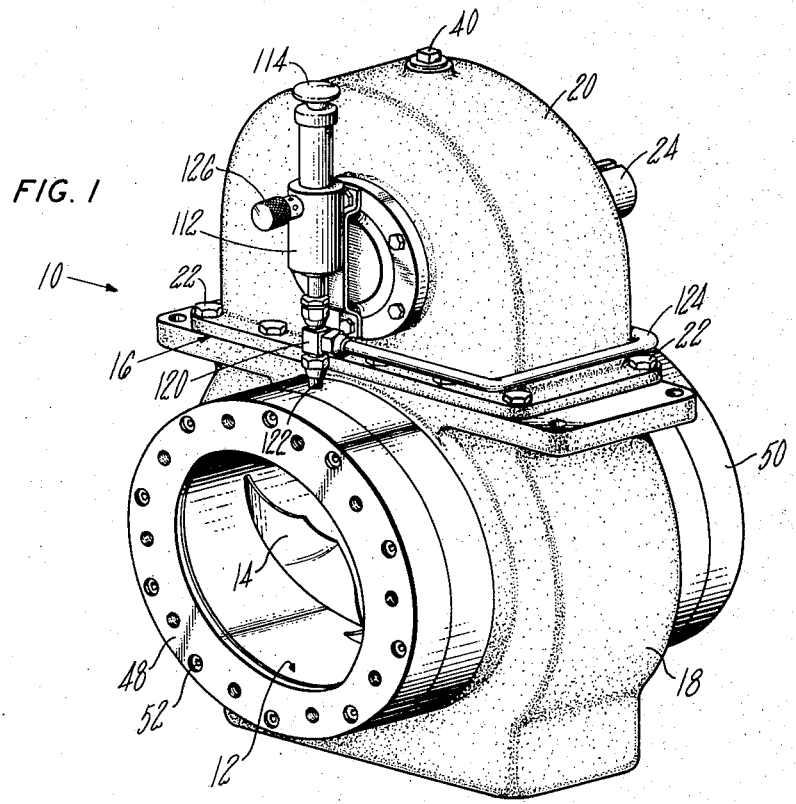
FIG. 1 is an isometric view of a pump incorporating this invention.

Referring to the drawings in detail, a preferred embodiment of this invention is shown for illustrative purposes as being incorporated in a pump 10. The pump 10 is an open center axial flow type such as that fully described in my U.S. Pat. No. 3,276,382 issued Oct. 4, 1966 and entitled "Fluid Flow Device." Pump 10 has a cylindrical rotor or drum 12 with impeller vanes such as at 14 providing a flow passageway for liquids, e.g., or mixtures of liquids and solid matter. The drum 12 is shown mounted for rotation within a stator or housing generally designated 16.

The housing 16 includes a base 18 upon which a gear casing 20 is secured by suitable fasteners, as by bolts 22, and a drive shaft 24 is shown rotatably supported on suitable bearings 26 mounted in gear casing 20. Fixed to drive shaft 24 is a radially extending flange 28 on which is mounted a drive gear 30 shown in mesh with a driven ring gear 32 secured by bolts as at 34 to the outside wall surface of drum 12.

Figure 2:
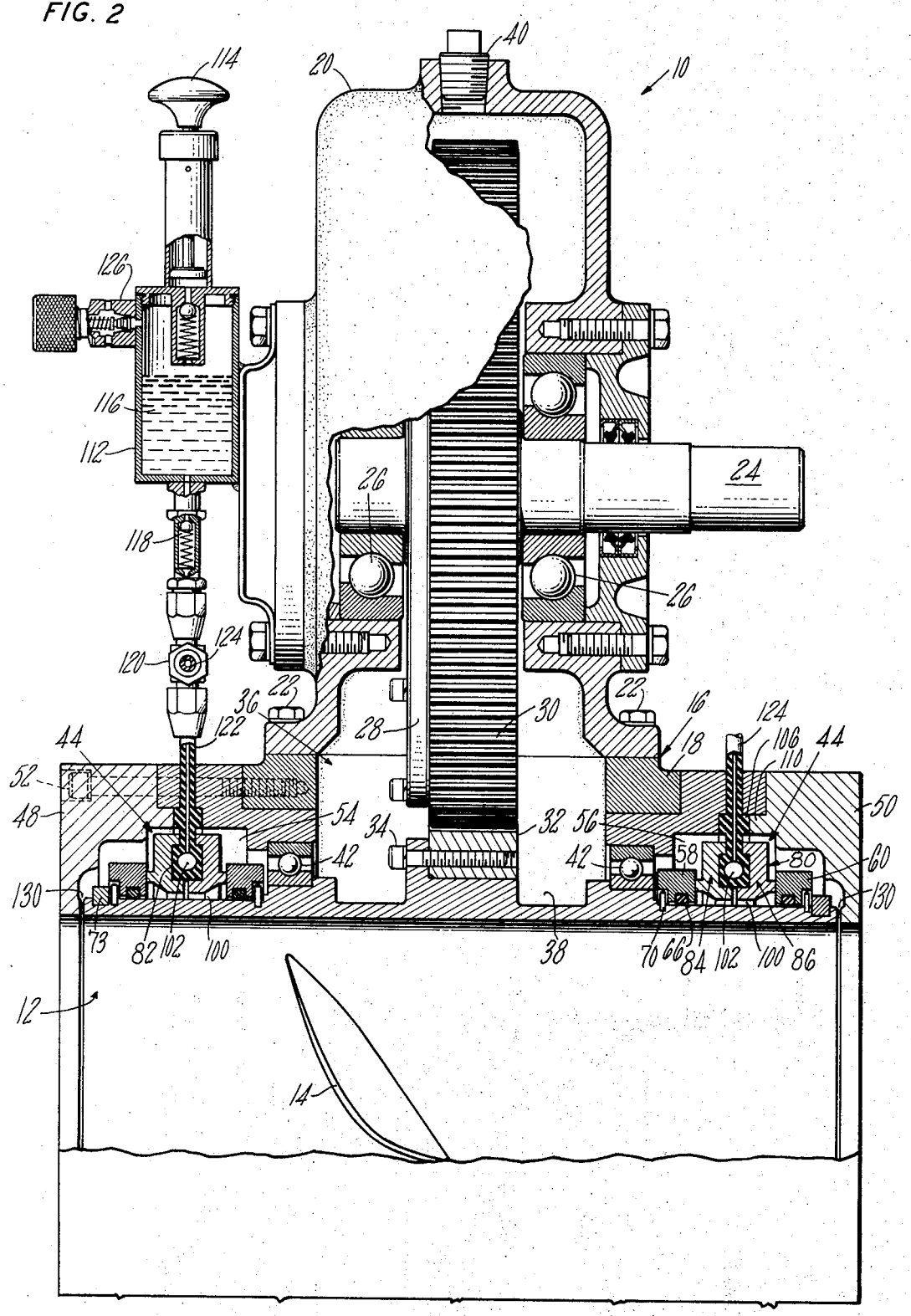
FIG. 2 is an enlarged view, partly broken away and partly in section, of the pump of FIG. 1.

As best seen in FIG. 2, the housing 16 defines an enclosed lubricant chamber 36 having an annular portion 38 formed in the base 18 to surround the drum 12 and which is normally filled with a suitable lubricant via a removable plug 40 at the top of gear casing 20 for lubrication of the above described drive and bearing components. Bearing 26 and bearings 42 which are mounted within housing 16 to support drum 12 for rotation, together with the gears 30, 32 operate in a normally hot oily environment within chamber 36 which must be protected from the intrusion of water and other contaminants. For this purpose, a pair of mechanical rotary seals 44, 44 are provided to circumferentially extend around drum 12 adjacent its opposite axial ends. In the illustrated embodiment, each of the seals 44, 44 are of substantially the same construction. A full understanding of this invention will be obtained from a description of one of the seals, and the same numbers will be used throughout the drawing figures to identify like parts.

To facilitate assembly of each seal 44, a pair of end mounting flanges 48 and 50 are secured by machine bolts such as at 52 to the housing 16 to maintain the seals 44, 44 in assembly with the drum 12 within enlarged annular seal cavities 54 and 56 circumferentially extending around opposite axial end portions of drum 12. The seal cavities 54, 56 will be understood to communicate with the adjacent portion 38 of the lubricant chamber 36 through the bearings 42.

Figure 3:
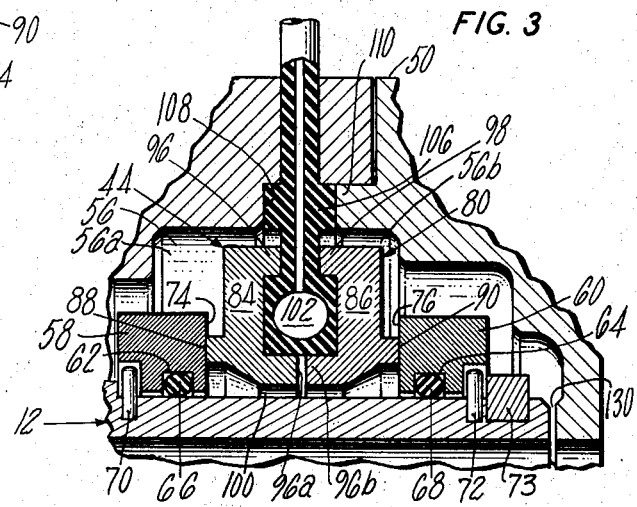
FIG. 3 is a further enlarged view, partly broken away and partly in section, of a mechanical rotary seal of this invention.

Referring now specifically to the mechanical rotary seal 44 within cavity 56, a pair of substantially identical but oppositely facing seal mating rings 58 and 60 are secured in axially spaced relation on the right-hand end portion of drum 12 as seen in FIGS. 2 and 3. The seal mating rings 58 and 60 are each shown having recessed grooves 62, 64 which will be understood to extend continuously around the inner peripheral surface of each seal mating ring 58 and 60 which are sealed with respect to the drum 12 by suitable O-rings 66 and 68 of conventional construction received in grooves 62, 64 with a desired radial interference fit to provide a fluid tight seal. The seal mating rings 58, 60 are each drivingly connected to the drum 12 by removable retaining pins such as shown at 70, 72 and the pins 70, 72 cooperate with a retaining ring 73 to releasably secure the seal 44 in position on the drum 12. Confronting side wall surfaces on the seal mating rings 58 and 60 extend radially outwardly of the drum 12 to present a pair of sealing surfaces or rotatable seats 74 and 76. The seal mating rings 58, 60 may be formed, e.g., of hardened stainless steel, and the seats 74, 76 preferably are lapped to provide precision sealing surfaces.

To protect the gear and bearing chamber 36 from the intrusion of water and any other contaminant while also ensuring that no axial thrust loading is exerted on the bearings 42 as a result of the sealing action of seals 44, 44, the seals are each provided a fluid energized central seal subassembly 80 which is particularly suited to provide optimum sealing engagement with the seats 74 and 76 with preloaded, balanced sealing pressure forces being exerted against each of the rotatable seats 74 and 76.

More specifically, the central seal subassembly 80 includes a sealing member 82, contained in a central section of a stationary seal unit and which divides its cavity 56 into separate sealed cavity sections 56a and 56b (as best seen in FIG. 3), and a pair of sealing rings 84 and 86 respectively mounted in cavity sections 56a and 56b. The sealing rings 84 and 86 are formed of a suitable material such as carbon and are preferably formed such that each ring 84, 86 is substantially identical but are positioned in oppositely facing directions. The radial sealing surface presented by these sealing rings 84, 86 is provided by relatively thin annular projecting lands 88, 90 formed on projections 92, 94 extending axially of the drum 12 in opposite directions to provide a radially disposed lapped sealing face for intimate sealing engagement with the confronting radially extending seats 74, 76 of the adjacent seal mating rings 58, 60. Sealing rings 84, 86 are each of generally C-shaped cross section and have a pair of locking shoulders 96, 96a and 98, 98b which extend toward one another for receiving the central sealing member 82. The inner diameter of each sealing ring 84, 86 is greater than the outer diameter of the drum 12 to form an enclosed inner annular compartment 100 surrounding the drum 12 and located radially inwardly of the sealing interfaces formed by mating engagement of lands 88, 90 with seats 74, 76.

Figure 4:
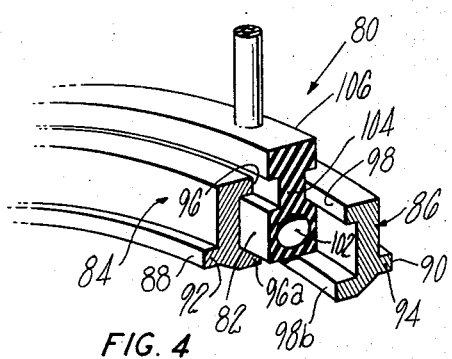
FIG. 4 is a fragmentary isometric view, partly in section, showing details of certain components of the seal of FIG. 3.

To provide optimum sealing engagement at the seal interfaces under varying operating conditions, extended serviceablility of each of the seals 44, 44 and balanced axially directed sealing pressure forces around drum 12, while also securing their sealing rings 84, 86 in fixed relation to housing 16, the central sealing member of each seal 44 comprises a fluid energized hollow expansible bladder 82. The bladder 82 is secured between locking shoulders 96, 96a and 98, 98b of the sealing rings 84 and 86 and defines a continuous plenum 102 extending around drum 12 within the confines of sealing rings 84, 86. As best seen in FIGS. 3 and 4, the bladder 82 has a configured outer peripheral section of generally T-shaped cross section with a reduced radially extending portion 104 secured between the upper locking shoulders 96, 98 of rings 84,86 and an enlarged outer peripheral collar 106 particularly suited to be clamped within a recess 108 of housing 16 by an annular shoulder 110 extending axially inwardly from the end mounting flanges such as that at 110 on flange 50. Plenum 102 is shown having a contoured, generally oval cross section with its major dimension extending in a direction axially of drum 12 such that, upon being pressurized, bladder 82 expands in a predetermined fashion in a generally horizontal direction axially of the drum 12 to apply equal but oppositely directed sealing pressure forces against sealing rings 84, 86 to be transmitted thereby to their rotatable seats 74, 76 for positively sealing the cavity sections 56a, 56b from compartment 100 across the radially extending interfaces with a balanced pressure force loading. Such a sealing construction not only minimizes any axial thrust loading on bearings 42 but also produces more equal wear of lands 88, 90 even under high pressure loading. Moreover, it is to be noted that the spacing between sealing rings 84, 86 is minimized to preclude any tendency of their moving inwardly responsive to a rapid start whereby the seal mating rings 58, 60 might tend to disengage form their pins 70, 72.

While any suitable connection may be made between the plenum 102 of the bladder 82 and a suitable source of pressurized fluid for energizing the central sealing subassembly 80 of the seals 44, for illustrative purposes the preferred embodiment is provided with a reservoir fluid tank 112 having a manually operated pump 114 for establishing a predetermined air pressure within the tank 112 to cause the fluid 116 held within the tank 112 to flow through a one-way check valve 118 leading to a common tee connector 120 and into fluid supply lines 122 and 124 which communicate with the plenums 102, 102 of the seals 44, 44. In addition, an adjustable relief valve 126 at the upper portion of tank 112 provides automatic relief of the tank should the pressure therein exceed the predetermined pressure called for by the setting of the relief valve 126.

Upon activating the pump 10 through its illustrated drive means wherein it will be understood that the drive shaft 24 is coupled to a suitable source of power, the positive sealing effects achieved by the multiple sealing interfaces in each annular seal cavity 54, 56 is significantly enhanced by the above described construction wherein the sealed annular compartments 100, 100 are located radially inwardly of the sealing interfaces within seal cavity portions 56a and 56b respectively communicate with the chamber 38 and with the material being pumped through the drum 12 via clearance gap 130 between the housing 16 and the drum 12. That is, the rotational effect of the revolving drum 12 causes a centrifugal force which, particularly with a relatively large diameter drum operating at high peripheral drum speeds, acts to impell any fluid or solid particles in either of the cavity portions 56a and 56b radially outwardly in a direction away from the sealing interfaces to minimize any possibility of a hydrodynamic film, or for that matter, any foreign particulate matter or other contaminant carried by the fluids in their respective cavity portions 56a, 56b from eroding or otherwise interfering with effective sealing engagement of the energized sealing subassembly 80. By virtue of the above described construction, no oil, water or other foreign matter will be present within the interior annular compartments 100, 100 of the seals 44, 44. The resulting centrifugal action accordingly acts not only to protect the seals 44, 44 but also to enhance their sealing effect and results in extending the expected wear life of the seals 44, 44 with minimized seal wear and erosion problems which would otherwise necessitate service requirements. At the same time, any possibility of contamination of the lubricant confined within chamber 36 is effectively minimized. Moreover, operation of the sealing subassemblies 80, 80 of this invention may be quickly and easily adjusted to vary the effective balanced sealing pressure forces under different operating conditions upon preloading the central sealing members 82, 82 with regulated pressurized fluid to provide an effective seal without lowering the life of the seal components while yet ensuring more even seal wear under high pressure loading.

As will be apparent to persons skilled in the art, various modifications, adaptations and variations of the foregoing specific disclosure can be made without departing from the teachings of the present invention.

I claim:

1. For sealing fluid flow between a stator and a generally cylindrical rotor supported for rotation on the stator, a seal comprising a pair of seal rings on the stator, a pair of seal mating rings concentrically fixed in axially spaced relation on the rotor in radially extending relation thereto, the seal rings of the stator being supported thereon between the mating rings for limited movement axially of the rotor, the seal rings and the seal mating rings jointly defining an annular compartment between the stator and the rotor, the seal rings of the stator and the seal mating rings of the rotor being in lapping sealing engagement providing a pair of seal interfaces extending radially of the rotor and enclosing said annular compartment, and a sealing member disposed between the seal rings in sealing engagement therewith and enclosing the annular compartment between the seal rings for sealing fluid flow between the stator and the rotor, the sealing member being expansible for biasing the seal rings in opposite directions axially of the rotor while additionally serving to fix the seal rings relative to the stator, said annular compartment being located radially inwardly of the seal interfaces and the sealing member, hereby centrifugal force caused by rotor rotation impels material outside said annular compartment radially outwardly away from the seal interfaces.

2. The seal of claim 1 wherein said sealing member comprises an expansible annular bladder, and wherein fluid supply means is connected to the bladder for biasing the seal rings in opposite directions axially of the rotor.

3. The seal of claim 2 wherein the bladder is configured and dimensioned to provide axially balanced sealing engagement between the seal rings and the mating seal rings.

4. The seal of claim 2 wherein the fluid supply means further includes fluid pressure regulating means for adjusting the sealing engagement between the seal rings and the mating seal rings.

5. The seal of claim 1 wherein the stator comprises a housing surrounding the rotor, and wherein the rotor comprises an open center cylinder having impeller vanes arranged on an interior wall surface of the cylinder.

6. For sealing fluid flow between a stator and a generally cylindrical rotor supported for rotation on the stator, a seal comprising an annular central sealing member on the stator, a pair of seal rings of generally C-shaped cross section disposed on the stator in oppositely facing relation to one another on opposite sides of the central sealing member, a pair of seal mating rings concentrically secured in spaced relation on the rotor, the seal rings being disposed between the seal mating rings and jointly defining therewith an annular compartment between the stator and the rotor, the seal rings each having an axially extending, annular projection forming a continuous radially extending land engageable with the adjacent seal mating ring in lapping sealing engagement providing a pair of seal interfaces extending radially of the rotor and enclosing said annular compartment, said annular compartment being located radially inwardly of the seal interfaces, whereby centrifugal force caused by rotor rotation impels material outside said annular compartment radially outwardly away from the seal interfaces, the central sealing member being a holow expansible member, and a fluid supply line connected to the central sealing member such that upon its being pressurized, the seal ring lands move outwardly axially of the rotor into sealing engagement with the adjacent seal mating rings.

7. The seal of claim 6 wherein the central sealing member is of a generally uniform cross sectional configuration defining a plenum and is configured and dimensioned to effect equal pressure forces in opposite directions axially of the rotor for biasing the seal ring lands into axially balanced sealing engagement with the seal mating rings of the rotor.

8. For sealing fluid flow between a stator and a generally cylindrical rotor supported for rotation on the stator, a seal comprising an annular central sealing member on the stator, a pair of seal rings of generally C-shaped cross section disposed on the stator in oppositely facing relation to one another on opposite sides of the central sealing member, a pair of seal mating rings concentrically secured in spaced relation on the rotor, the seal rings being disposed between the seal mating rings and jointly defining therewith an annular compartment between the stator and the rotor, the seal rings each having an axially extending, annular projection forming a continuous radially extending land engageable with the adjacent seal mating ring in lapping sealing engagement providing a pair of seal interfaces extending radially of the rotor and enclosing said annular compartment, said annular compartment being located radially inwardly of the seal interfaces, whereby centrifugal force caused by rotor rotation impels material outside said annular compartment radially outwardly away from the seal interfaces, the central sealing member and the seal rings being in fixed relation to one another and to the stator with the central sealing member extending radially away from said annular compartment and sealing fluid flow between the stator and the rotor.

9. The seal of claim 8 wherein the seal rings are disposed in spaced apart concentric relation about an outer wall surface of the rotatable cylinder, wherein an O-ring seal is received between each seal ring and the cylinder to provide a fluid tight seal therebetween, and wherein removable retaining means releasably secure the seal rings to the cylinder.

10. For sealing fluid flow between a stator and a generally cylindrical rotor supported for rotation on the stator, a seal comprising an annular central sealing member on the stator, and a pair of seal rings of generally C-shaped cross section disposed on the stator in oppositely facing relation to one another on opposite sides of the central sealing member, a pair of seal mating rings concentrically secured in spaced relation on the rotor, the seal rings being disposed between the seal mating rings and jointly defining therewith an annular compartment between the stator and rotor, the seal rings each having an axially extending, annular projection forming a continuous radially extending land engageable with the adjacent seal mating ring in lapping sealing engagement providing a pair of seal interfaces extending radially of the rotor and enclosing said annular compartment, said annular compartment being located radially inwardly of the seal interfaces, whereby centrifugal force caused by rotor rotation impels material outside said annular compartment radially outwardly away from the seal interfaces, the central sealing member having a peripheral portion extending radially of the rotor, and the stator including an end flange engaging the peripheral portion of the central sealing member and securing the same in fixed relation to the stator.

* * * * *